United States Patent
Nakaya et al.

(10) Patent No.: US 12,282,826 B2
(45) Date of Patent: Apr. 22, 2025

(54) CALL REGISTRATION DEVICE

(71) Applicant: Mitsubishi Electric Corporation, Tokyo (JP)

(72) Inventors: Akihiro Nakaya, Tokyo (JP); Naohiko Suzuki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/681,515

(22) PCT Filed: Sep. 9, 2021

(86) PCT No.: PCT/JP2021/033108
§ 371 (c)(1),
(2) Date: Feb. 6, 2024

(87) PCT Pub. No.: WO2023/037466
PCT Pub. Date: Mar. 16, 2023

(65) Prior Publication Data
US 2024/0354531 A1    Oct. 24, 2024

(51) Int. Cl.
*G06K 7/14* (2006.01)
(52) U.S. Cl.
CPC ................... *G06K 7/1417* (2013.01)
(58) Field of Classification Search
CPC .................................................. G06K 7/1417
USPC ....................................................... 235/382
See application file for complete search history.

(56) References Cited

U.S. PATENT DOCUMENTS

2007/0151809 A1*  7/2007  Tyni ......................... B66B 3/00
187/391

FOREIGN PATENT DOCUMENTS

| | | | |
|---|---|---|---|
| CN | 111453564 | A | 7/2020 |
| CN | 112233305 | A | 1/2021 |
| JP | H11-283126 | A | 10/1999 |
| JP | 2003-312950 | A | 11/2003 |
| JP | 2005-272100 | A | 10/2005 |
| JP | 2005-280882 | A | 10/2005 |
| JP | 2006-005537 | A | 1/2006 |
| JP | 2006-096517 | A | 4/2006 |
| JP | 2007-084179 | A | 4/2007 |
| JP | 2018-080033 | A | 5/2018 |

(Continued)

OTHER PUBLICATIONS

International Search Report mailed on Nov. 30, 2021, received for PCT Application PCT/JP2021/033108, filed on Sep. 9, 2021, 05 pages including English Translation.

(Continued)

*Primary Examiner* — Daniel A Hess
(74) *Attorney, Agent, or Firm* — XSENSUS LLP

(57) ABSTRACT

A registration device includes a reader, a specification unit, a determination unit, a setting unit and a call registration unit. The specification unit specifies a plurality of candidate floors on the basis of a two-dimensional barcode. In a case where it is determined by the determination unit that a candidate floor that matches an installation floor is included, the setting unit sets the candidate floor as a departure floor and sets another candidate floor included in the plurality of candidate floors as a destination floor. The call registration unit registers a call for a car on the basis of the departure floor and the destination floor set by the setting unit.

7 Claims, 10 Drawing Sheets

(56) References Cited

FOREIGN PATENT DOCUMENTS

WO  2018/008143 A1  1/2018

OTHER PUBLICATIONS

Office Action mailed on Dec. 9, 2022, received for TW Application 110146241, 15 pages including English Translation.

* cited by examiner

FIG. 2

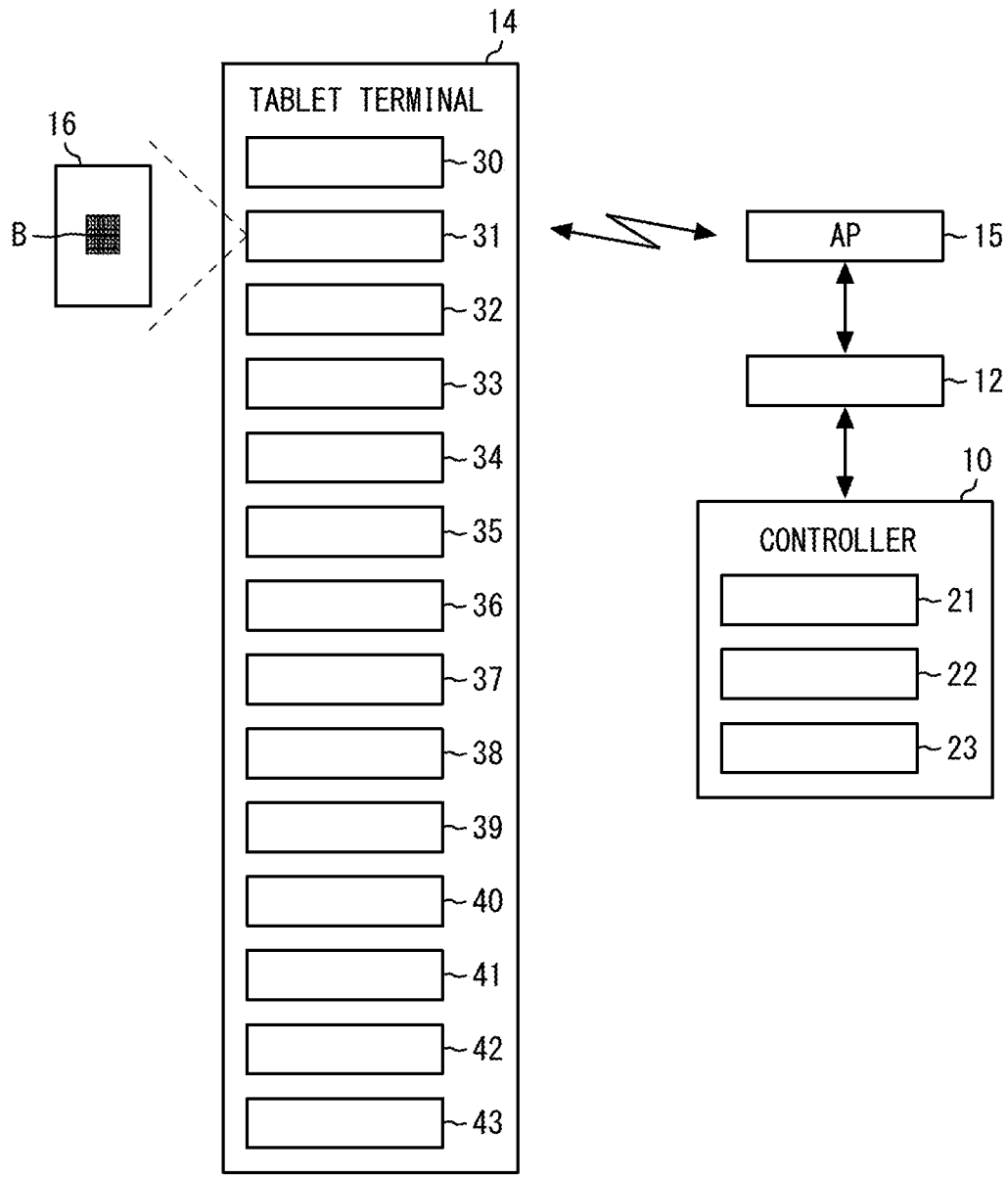

30: INDICATOR
31: CAMERA
32: STORAGE UNIT
33: READING UNIT
34: SPECIFICATION UNIT
35: DETERMINATION UNIT
36: SETTING UNIT
37: COMMUNICATION UNIT
38: INDICATION CONTROL UNIT
39: DETERMINATION UNIT
40: DETERMINATION UNIT
41: DETERMINATION UNIT
42: INFORMATION CONVERSION UNIT
43: INFORMATION REGISTRATION UNIT

12: COMMUNICATION DEVICE

21: CALL REGISTRATION UNIT
22: OPERATION CONTROL UNIT
23: INDICATION CONTROL UNIT

S101: IS TWO-DIMENSIONAL BARCODE READ?
S102: SPECIFY CANDIDATE FLOORS
S103: DOES CANDIDATE FLOOR MATCH INSTALLATION FLOOR?
S104: SET DEPARTURE FLOOR
S105: SET DESTINATION FLOOR
S106: TRANSMIT REGISTRATION REQUEST
S107: INDICATE ERROR

S901: IS REGISTRATION REQUEST RECEIVED?
S902: REGISTER CALL
S903: RESPOND

S201: IS TWO-DIMENSIONAL BARCODE READ?
S202: SPECIFY CANDIDATE FLOORS
S203: DOES CANDIDATE FLOOR MATCH INSTALLATION FLOOR?
S204: SET DEPARTURE FLOOR
S205: SET DESTINATION FLOOR
S206: TRANSMIT REGISTRATION REQUEST
S207: SET INSTALLATION FLOOR AS DEPARTURE FLOOR
S208: SET FARTHEST FLOOR AS DESTINATION FLOOR

S301: IS TWO-DIMENSIONAL BARCODE READ?
S302: SPECIFY CANDIDATE FLOORS
S303: DOES CANDIDATE FLOOR MATCH INSTALLATION FLOOR?
S304: SET DEPARTURE FLOOR
S305: SET DESTINATION FLOOR
S306: TRANSMIT REGISTRATION REQUEST
S307: INDICATE ERROR
S308: SECURITY DETERMINATION

S401: DOES CANDIDATE FLOOR MATCH DESTINATION RESTRICTED FLOOR?

S501: DOES CANDIDATE FLOOR MATCH DESTINATION RESTRICTED FLOOR?
S502: PERMIT MOVEMENT TO DESTINATION RESTRICTED FLOOR?

S601: SPECIFY VALIDITY PERIOD
S602: IS VALIDITY PERIOD EXPIRED?

S701: SPECIFY IDENTIFICATION NUMBER
S702: SPECIFY THE NUMBER OF TIMES OF REGISTRATION
S703: IS REFERENCE NUMBER OF TIMES EXCEEDED?

S801: WEEKDAY?
S802: DETERMINE FIRST CANDIDATE FLOOR
S803: HOURS TP1?
S804: DETERMINE SECOND CANDIDATE FLOOR
S805: HOURS TP2?
S806: DETERMINE THIRD CANDIDATE FLOOR
S807: HOURS TP3?
S808: DETERMINE FOURTH CANDIDATE FLOOR
S809: DETERMINE FIFTH CANDIDATE FLOOR

CALL REGISTRATION DEVICE

CROSS-REFERENCE TO RELATED APPLICATION

This application is a national stage application, pursuant to 35 U.S.C. § 371, of International Patent Application No. PCT/JP2021/033108, filed Sep. 9, 2021, the entire contents of which are incorporated herein by reference.

TECHNICAL FIELD

The present disclosure relates to a call registration device to be used in an elevator.

BACKGROUND ART

PTL 1 discloses an elevator device. The elevator device disclosed in PTL 1 includes a reading device installed on the first floor of a building. A user causes a two-dimensional barcode to be indicated on a liquid crystal screen of a mobile terminal and causes the reading device to read the two-dimensional barcode. If an ID number included in the two-dimensional barcode matches the registered number, an entrance door is unlocked, and a car of an elevator arrives on the first floor.

CITATION LIST

Patent Literature

[PTL 1] JP 2005-280882 A

SUMMARY

Technical Problem

In the elevator device disclosed in PTL 1, the user has to input a destination floor when the user gets on the car. For example, in a case where the user who causes the reading device to read the two-dimensional barcode on the first floor moves to the fifth floor and then returns to the first floor from the fifth floor, the user inputs a destination floor at a hall on the fifth floor or when the user gets on the car on the fifth floor. The user needs to perform input operation, and thus, there is a problem that the elevator device is poor in convenience.

The present disclosure is made in order to solve the problem as described above. An object of the present disclosure is to provide a call registration device capable of reducing input operation by a user and improving convenience.

Solution to Problem

A call registration device according to the present disclosure comprises a reader, specification means for, if a two-dimensional barcode including information on a plurality of candidate floors is read by the reader, specifying the plurality of candidate floors on a basis of the two-dimensional barcode, first determination means for determining whether or not a candidate floor that matches an installation floor of the reader is included in the plurality of candidate floors specified by the specification means, setting means for, in a case where it is determined by the first determination means that the candidate floor that matches the installation floor is included, setting the candidate floor as a departure floor and setting another candidate floor included in the plurality of candidate floors as a destination floor, and call registration means for registering a call for a car of an elevator on a basis of the departure floor and the destination floor set by the setting means.

Advantageous Effects of the Invention

According to a call registration device of the present disclosure, it is possible to reduce input operation by a user and improve convenience.

BRIEF DESCRIPTION OF DRAWINGS

FIG. 2 is a diagram for explaining functions of the elevator device illustrated in FIG. 1.

DESCRIPTION OF EMBODIMENTS

Figure 1:
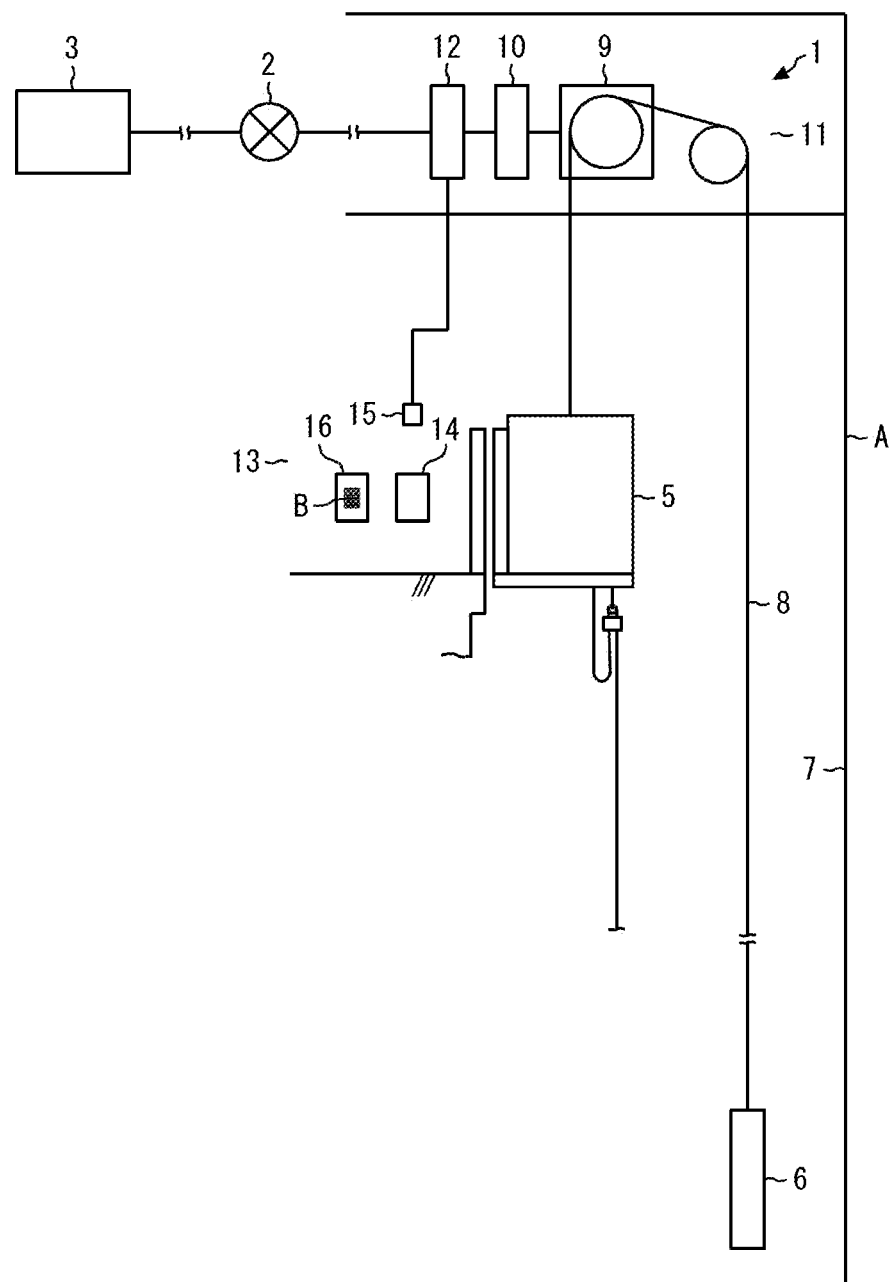
FIG. 1 is a diagram illustrating an example of an elevator device including a call registration device in a first embodiment.

Detailed description will be provided below with reference to the drawings. Redundant description will be simplified or omitted as appropriate. In the drawings, the same reference numerals indicate the same portions or corresponding portions.

First Embodiment

FIG. 1 is a diagram illustrating an example of an elevator device 1 including a call registration device in a first embodiment. The elevator device 1 is connected to a server 3 via a network 2. As an example, the network 2 is an IP network. The IP network is a communication network using internet protocol (IP) as communication protocol. The network 2 is preferably a closed network. The network 2 may be an open network.

The server 3 is provided at an information center remote from the elevator device 1. The server 3 can communicate with a number of elevator devices. The elevator device 1 is an example of the elevator devices with which the server 3 can communicate.

The elevator device 1 includes a car 5 and a counterweight 6. The car 5 moves up and down in a shaft 7. The shaft 7 is a space formed in a building A and vertically extending. The car 5 and the counterweight 6 are hung with a rope 8 in the shaft 7. The counterweight 6 moves up and down in the shaft 7 in a direction reverse to a direction in which the car 5 moves. FIG. 1 illustrates the elevator device 1 employing a 1:1 roping system as an example.

The rope 8 is wound around a traction machine 9. The car 5 is driven by the traction machine 9. A controller 10 controls the traction machine 9. In other words, movement of the car 5 is controlled by the controller 10. FIG. 1 illustrates an example where the traction machine 9 and the controller 10 are provided in a machine room 11 above the shaft 7. The traction machine 9 and the controller 10 may be provided in the shaft 7. The traction machine 9 may be provided at the top of the shaft 7 or may be provided at a pit of the shaft 7.

A communication device 12 is connected to the controller 10. The communication device 12 realizes a communication function in the elevator device 1. For example, the communication device 12 communicates with external equipment. The external equipment includes the server 3. In other words, the communication device 12 communicates with the server 3 via the network 2.

A hall 13 is provided on each floor of the building A. FIG. 1 illustrates a state where the car 5 stops at one hall 13. A tablet terminal 14 and an access point 15 are provided at each hall 13. The access point 15 is connected to the communication device 12. The tablet terminal 14 is a device that is permanently installed at the hall 13. The tablet terminal 14 wirelessly communicates with the access point 15. In other words, the tablet terminal 14 can communicate with the communication device 12 via the access point 15.

FIG. 2 is a diagram for explaining functions of the elevator device 1 illustrated in FIG. 1. As illustrated in FIG. 2, the controller 10 includes a call registration unit 21, an operation control unit 22 and an indication control unit 23. The tablet terminal 14 includes an indicator 30, a camera 31, a storage unit 32, a reading unit 33, a specification unit 34, a determination unit 35, a setting unit 36, a communication unit 37 and an indication control unit 38. The indication control unit 38 controls the indicator 30.

Operation of the elevator device 1 will be described in detail below also with reference to FIG. 3 and FIG. 4. In the following description, an example will be described where a user moves from the first floor that is an entrance floor of the building A to the seventh floor on which an office is located and then returns to the first floor from the seventh floor. In other words, the user travels back and force between the first floor and the seventh floor.

Further, the user causes a mobile terminal 16 to store a two-dimensional barcode B. This two-dimensional barcode B is created in the mobile terminal 16 using a specific application. The two-dimensional barcode B may be received from another terminal as electronic data. As an example, the mobile terminal 16 is a smartphone.

Figure 3:
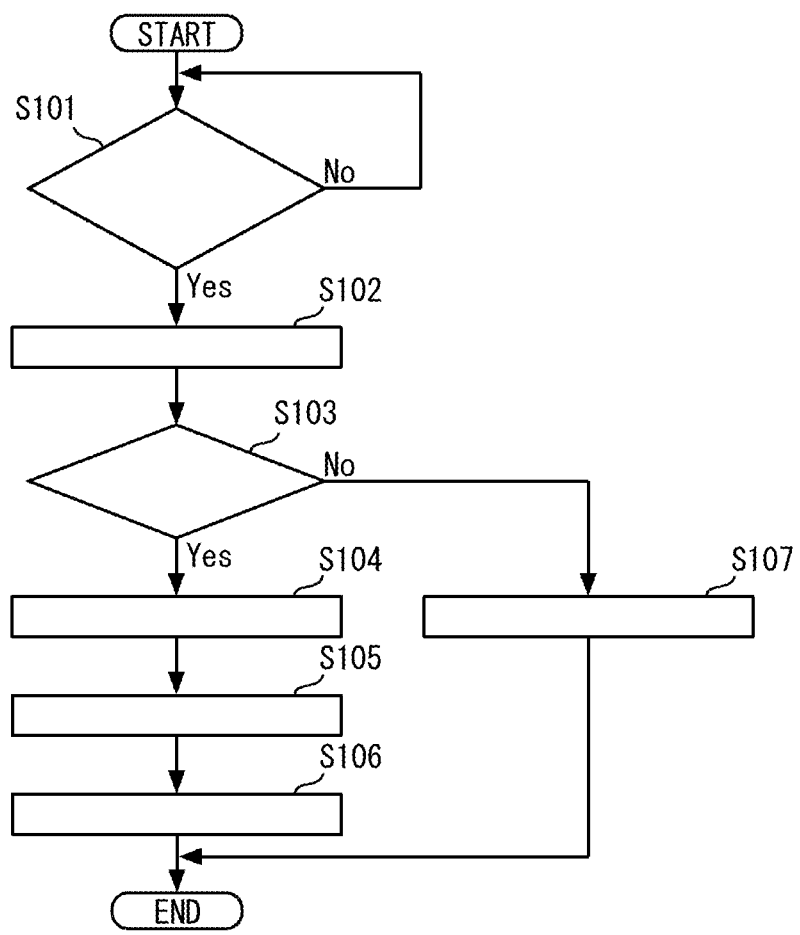
FIG. 3 is a flowchart indicating an operation example of a tablet terminal.

FIG. 3 is a flowchart indicating an operation example of the tablet terminal 14. As described above, the tablet terminal 14 is provided at the hall 13 on each floor. In the following description, if it is necessary to individually specify the tablet terminals 14, "-N" is attached after the reference numeral. N represents the floor number. In a similar manner, if it is necessary to individually specify the halls 13 provided in the building A, "-N" is attached after the reference numeral.

For example, the hall on the first floor will be expressed as a hall 13-1. The hall on the second floor will be expressed as a hall 13-2. The hall on the seventh floor will be expressed as a hall 13-7. A tablet terminal 14-1 is provided at the hall 13-1. A tablet terminal 14-2 is provided at the hall 13-2. A tablet terminal 14-7 is provided at the hall 13-7.

In the tablet terminal 14-1, it is determined whether or not a two-dimensional barcode is read (S101). The user causes the two-dimensional barcode B to be indicated on a display of the mobile terminal 16 at the hall 13-1. The two-dimensional barcode B includes information on a plurality of candidate floors. In the simplest example, the two-dimensional barcode B includes information on two candidate floors including a first candidate floor and a second candidate floor. In the present example, the first candidate floor is the first floor. The second candidate floor is the seventh floor.

The user waves the two-dimensional barcode B indicated on the display of the mobile terminal 16 over the camera 31. By this means, an image of the two-dimensional barcode B is captured by the camera 31. The reading unit 33 reads the two-dimensional barcode B on the basis of the image captured by the camera 31. If the reading unit 33 reads the two-dimensional barcode B, it is determined Yes in S101. In the example indicated in the present embodiment, a reader for reading a two-dimensional barcode is implemented by the camera 31 and the reading unit 33.

The specification unit 34 specifies a plurality of candidate floors on the basis of the two-dimensional barcode B read in S101 (S102). In the present example, the two-dimensional barcode B includes information on the first candidate floor and the second candidate floor. Thus, the specification unit 34 specifies the first candidate floor and the second candidate floor in S102.

The determination unit 35 determines whether or not the plurality of candidate floors specified by the specification unit 34 in S102 include a candidate floor that matches a floor on which the reader is installed, that is, a floor on which the tablet terminal 14 is installed (S103). In the following description, the floor on which the tablet terminal 14 is installed will be also referred to as an installation floor. Information on the installation floor is stored in the storage unit 32.

In the present example, the two-dimensional barcode B includes information on the first candidate floor and the second candidate floor. The first candidate floor is the first floor. Further, information indicating the "first floor" is stored as the information on the installation floor in the storage unit 32 of the tablet terminal 14-1. Thus, the determination unit 35 determines Yes in S103.

In a case where it is determined Yes in S103, the setting unit 36 sets one candidate floor determined as matching the installation floor as a departure floor (S104). In the present example, the setting unit 36 sets the first candidate floor, that is, the first floor as the departure floor.

In a case where it is determined Yes in S103, the setting unit 36 sets another candidate floor included in the candidate floors specified by the specification unit 34 in S102 as a destination floor (S105). In the present example, in S102, the specification unit 34 specifies only two candidate floors of the first candidate floor and the second candidate floor. Thus, in a case where the first candidate floor is set as the departure floor in S104, the setting unit 36 sets the second candidate floor that is the other candidate floor, that is, the seventh floor as the destination floor in S105.

Note that if the plurality of candidate floors specified by the specification unit 34 in S102 do not include a candidate floor that matches the installation floor, it is determined No in S103. In a case where it is determined No in S103, the setting unit 36 does not set the departure floor and the destination floor. In the tablet terminal 14-1, it is determined as a call registration error. For example, in a case where it is determined No in S103, the indication control unit 38 indicates an error on the indicator 30 (S107).

If the departure floor is set in S104, and the destination floor is set in S105, the communication unit 37 transmits a call registration request C to the controller 10 (S106). The registration request C includes information on the departure floor set in S104 and information on the destination floor set in S105. Specifically, the registration request C transmitted from the tablet terminal 14-1 in S106 is received by the access point 15. The registration request C received by the access point 15 is transmitted to the controller 10 via the communication device 12.

Figure 4:
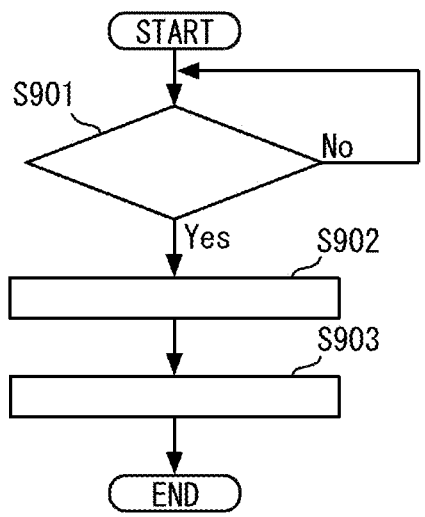
FIG. 4 is a flowchart indicating an operation example of a controller.

FIG. 4 is a flowchart indicating an operation example of the controller 10. In the controller 10, it is determined whether or not a call registration request is received (S901). In a case where the controller 10 receives the call registration request C transmitted from the tablet terminal 14-1, it is determined Yes in S901. In a case where it is determined Yes in S901, the call registration unit 21 registers a call for the car 5 on the basis of the received registration request C, that is, the departure floor and the destination floor set by the setting unit 36 (S902). Further, the operation control unit 22 causes the car 5 to respond to the call registered by the call registration unit 21 (S903). The indication control unit 23 controls a hall lantern, and the like, provided at the hall 13 in accordance with response control by the operation control unit 22.

For example, the call registration unit 21 registers a call corresponding to the departure floor. By this means, the operation control unit 22 stops the car 5 at the hall 13-1. Then, the operation control unit 22 opens and closes a door of the car 5 at the hall 13-1. If it is detected that the user gets on the car 5, the call registration unit 21 registers a call corresponding to the destination floor. By this means, the operation control unit 22 stops the car 5 at the hall 13-7.

Any method may be used as a method for detecting that the user gets on the car 5. For example, a load weighing device for measuring a load of the car 5 is including in the car 5. The detection is performed on the basis of the load measured by the load weighing device. As another example, a camera is including in the car 5. The detection may be performed on the basis of an image captured by the camera. A signal indicating that the door is closed may be used for the detection.

According to the present example, the user can get on the car 5 from the hall 13-1 and get off the car 5 at the hall 13-7 only by waving the two-dimensional barcode B over the camera 31. The user does not need to input the destination floor at the hall 13-1 or when the user gets on the car 5 on the first floor.

The operation flow indicated in FIG. 3 is also performed in the tablet terminal 14-7. In other words, in the tablet terminal 14-7, it is determined whether or not the two-dimensional barcode is read (S101). The user who has finished work in the office on the seventh floor causes the two-dimensional barcode B to be indicated on the display of the mobile terminal 16 at the hall 13-7. As described above, in the present example, the two-dimensional barcode B includes information on the first candidate floor (first floor) and the second candidate floor (seventh floor). If the camera 31 captures an image of the two-dimensional barcode B, and the reading unit 33 reads the two-dimensional barcode B, it is determined Yes in S101.

The specification unit 34 specifies the first candidate floor and the second candidate floor in S102. Further, information indicating the "seventh floor" is stored as information on the installation floor in the storage unit 32 of the tablet terminal 14-7. Thus, the determination unit 35 determines Yes in S103.

In a case where it is determined Yes in S103, the setting unit 36 sets the second candidate floor that matches the installation floor, that is, the seventh floor as the departure floor in S104. The setting unit 36 sets the first candidate floor that is the other candidate floor, that is, the first floor as the destination floor in S105. By this means, the call registration request C is transmitted from the communication unit 37 to the controller 10 in S106.

If the controller 10 receives the call registration request C transmitted from the tablet terminal 14-7, it is determined Yes in S901. In a case where it is determined Yes in S901, the call registration unit 21 registers a call corresponding to the departure floor. By this means, the operation control unit 22 stops the car 5 at the hall 13-7. Then, the operation control unit 22 opens and closes the door of the car 5 at the hall 13-7. If it is detected that the user gets on the car 5, the call registration unit 21 registers a call corresponding to the destination floor. By this means, the operation control unit 22 stops the car 5 at the hall 13-1.

According to the present example, the user can get on the car 5 from the hall 13-7 and get off the car 5 at the hall 13-1 only by waving the two-dimensional barcode B over the camera 31. The user does not need to input the destination floor at the hall 13-7 or when the user gets on the car 5 on the seventh floor. According to the example indicated in the present embodiment, it is possible to reduce input operation on site by the user and improve convenience.

In the present embodiment, an example has been described where the user causes the two-dimensional barcode B to be indicated on the display of the mobile terminal 16. The user may wave the two-dimensional barcode B printed on paper over the camera 31 of the tablet terminal 14. The user may wave the two-dimensional barcode B indicated on other media over the camera 31 of the tablet terminal 14.

In the present embodiment, an example has been described where the tablet terminal 14 is provided at the hall 13. Both the tablet terminal 14 and a hall operating panel may be provided at the hall 13. Further, a car operating panel may be provided in the car 5.

In the present embodiment, an example has been described where one elevator device 1 is provided in the building A. A plurality of elevator devices including the elevator device 1 may be provided in the building A. The plurality of elevator devices may be controlled as a group.

Other functions that can be employed by the elevator device 1 will be described below. The elevator device 1 may employ a combination of a plurality of functions indicated below if possible.

At the building A, to improve security, there is a case where a floor for entrance to the building A is different from a floor for exit from the building A. An example where the user who visits the office located on the seventh floor moves from the second floor that is an entrance floor of the building A to the seventh floor and then moves from the seventh floor to the first floor to exit the building A will be described below.

Also in such an example, the user causes the two-dimensional barcode B to be stored in the mobile terminal 16. The two-dimensional barcode B includes information on two candidate floors of the first candidate floor and the second candidate floor. Also in the present example, the first candidate floor is the first floor. The second candidate floor is the seventh floor.

Figure 5:
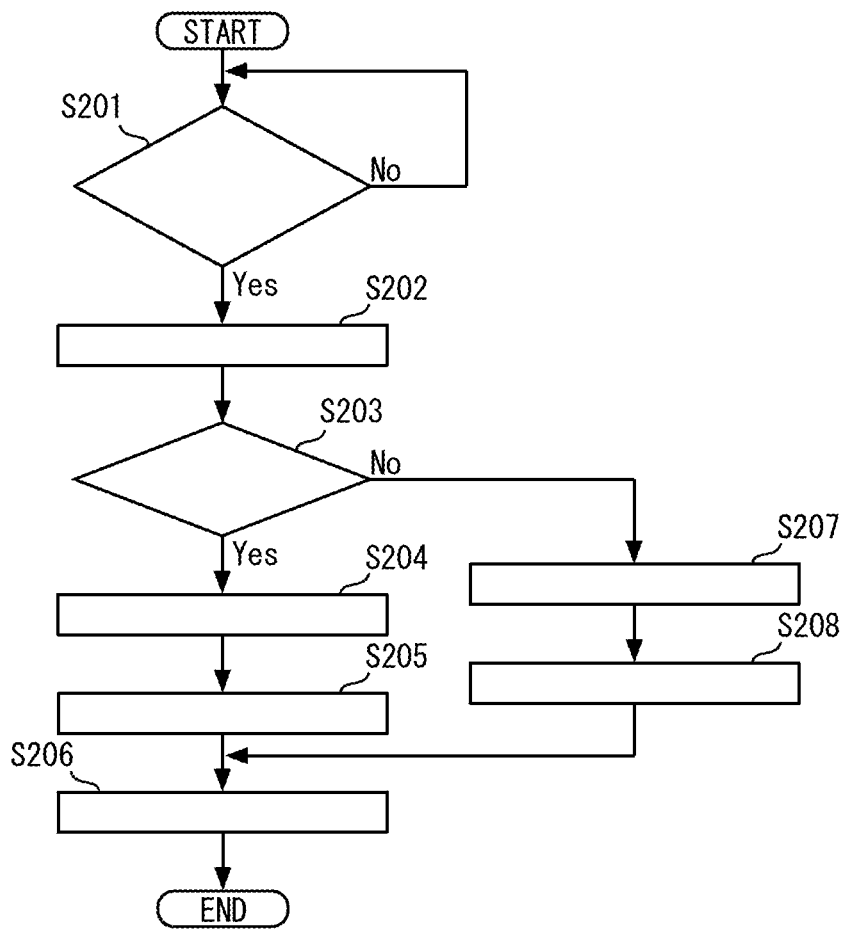
FIG. 5 is a flowchart indicating another operation example of the tablet terminal.

FIG. 5 is a flowchart indicating another operation example of the tablet terminal 14. The processing indicated from S201 to S206 in FIG. 5 is similar to the processing indicated from S101 to S106 in FIG. 3.

In the tablet terminal 14-2, it is determined whether or not a two-dimensional barcode is read (S201). The user causes the two-dimensional barcode B to be indicated on the display of the mobile terminal 16 at the hall 13-2. As described above, in the present example, the two-dimensional barcode B includes information on the first candidate floor (first floor) and the second candidate floor (seventh floor). If the camera 31 captures an image of the two-dimensional barcode B and the reading unit 33 reads the two-dimensional barcode B, it is determined Yes in S201.

The specification unit 34 specifies the first candidate floor and the second candidate floor in S202. Further, information indicating the "second floor" is stored in the storage unit 32 of the tablet terminal 14-2 as information on the installation floor. In the present example, the plurality of candidate floors specified by the specification unit 34 in S202 do not include a candidate floor that matches the installation floor. Thus, the determination unit 35 determines No in S203.

In a case where it is determined No in S203, the setting unit 36 sets the installation floor as the departure floor (S207). In the present example, the setting unit 36 sets the second floor as the departure floor.

In a case where it is determined No in S203, the setting unit 36 sets a candidate floor farthest from the installation floor among the plurality of candidate floors specified by the specification unit 34 in S202 as the destination floor (S208). In the present example, in S202, the specification unit 34 specifies only two candidate floors of the first candidate floor and the second candidate floor. Thus, the setting unit 36 sets the second candidate floor farther from the installation floor than the first candidate floor, that is, the seventh floor as the destination floor in S208.

If the departure floor is set in S207 and the destination floor is set in S208, the communication unit 37 transmits the call registration request C to the controller 10 (S206). The registration request C includes information on the departure floor set in S207 and information on the destination floor set in S208.

Also in the present example, in the controller 10, the operation flow indicated in FIG. 4 is performed. In the present example, the user can get on the car 5 from the hall 13-2 and get off the car 5 at the hall 13-7 only by waving the two-dimensional barcode B over the camera 31. The user does not need to input the destination floor at the hall 13-2 or when the user gets on the car 5 on the second floor.

Further, the operation flow indicated in FIG. 5 is also performed in the tablet terminal 14-7. In other words, in the tablet terminal 14-7, it is determined whether or not the two-dimensional barcode is read (S201). The user who has finished work at the office on the seventh floor causes the two-dimensional barcode B to be indicated on the display of the mobile terminal 16 at the hall 13-7. As described above, in the present example, the two-dimensional barcode B includes information on the first candidate floor (first floor) and the second candidate floor (seventh floor). Further, information indicating the "seventh floor" is stored as information on the installation floor in the storage unit 32 of the tablet terminal 14-7. Thus, in a case where it is determined Yes in S201, it is also determined Yes in S203.

In a case where it is determined Yes in S203, the setting unit 36 sets the second candidate floor that matches the installation floor, that is, the seventh floor as the departure floor in S204. The setting unit 36 sets the first candidate floor that is the other candidate floor, that is, the first floor as the destination floor in S205. By this means, in S206, the call registration request C is transmitted from the communication unit 37 to the controller 10.

In the present example, the user can get on the car 5 from the hall 13-7 and get off the car 5 at the hall 13-1 only by waving the two-dimensional barcode B over the camera 31. The user does not need to input the destination floor at the hall 13-7 or when the user gets on the car 5 on the seventh floor. Also in the present example, it is possible to reduce input operation on site by the user and improve convenience.

As another example, a function for improving security may be further included in the tablet terminal 14. In such a case, the tablet terminal 14 further includes a determination unit 39 as illustrated in FIG. 2. Alternatively, the tablet terminal 14 further includes the determination unit 39 and a determination unit 40. An example where a function for improving security is further added will be described below also with reference to FIG. 6 to FIG. 10. It is assumed in the following example that the user moves from the first floor that is an entrance floor of the building A to the seventh floor on which the office is located and then returns to the first floor from the seventh floor.

Figure 6:
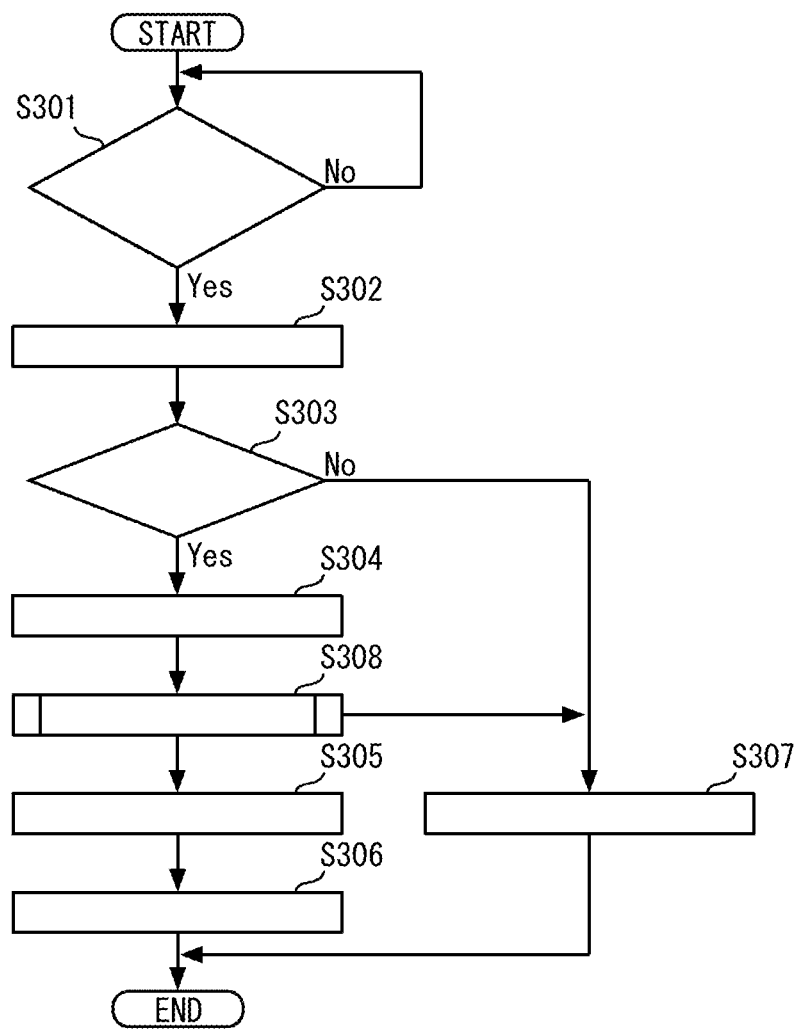
FIG. 6 is a flowchart indicating another operation example of the tablet terminal.

FIG. 6 is a flowchart indicating another operation example of the tablet terminal 14. The processing indicated from S301 to S307 in FIG. 6 is substantially similar to the processing indicated from S101 to S107 in FIG. 3. The example indicated in FIG. 6 is different from the example indicated in FIG. 3 in that security determination processing in S308 is further included.

Figure 7:
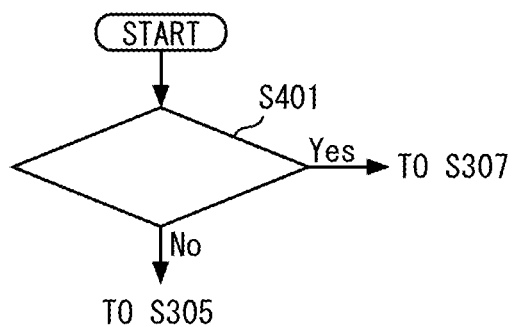
FIG. 7 is a flowchart indicating an example of security determination processing.

FIG. 7 is a flowchart indicating an example of the security determination processing. In the example indicated in FIG. 7, the two-dimensional barcode B includes information on the first candidate floor (first floor) and the second candidate floor (seventh floor). Thus, by the user waving the two-dimensional barcode B over the camera 31 at the hall 13-1, it is determined Yes in S303, and the setting unit 36 sets the first candidate floor as the departure floor in S304.

If the departure floor is set in S304, the determination unit 39 determines whether or not another candidate floor that becomes the destination floor among the candidate floors specified by the specification unit 34 in S302 matches a specific destination restricted floor (S401). In the present example, the specification unit 34 specifies only two candidate floors of the first candidate floor and the second candidate floor in S302. Thus, in S401, the determination unit 39 determines whether or not the second candidate floor matches the destination restricted floor.

Information on the destination restricted floor is stored in the storage unit 32. The determination unit 39 determines Yes in S401 if the second candidate floor specified by the specification unit 34 in S302 matches the destination restricted floor stored in the storage unit 32. In a case where it is determined Yes in S401, the processing proceeds to processing in S307. In other words, in a case where it is determined Yes in S401, the setting unit 36 does not set the second candidate floor as the destination floor. In the tablet terminal 14-1, it is determined as a call registration error. For example, in a case where it is determined Yes in S401, the indication control unit 38 indicates an error on the indicator 30.

On the other hand, in a case where the second candidate floor does not match the destination restricted floor, the determination unit 39 determines No in S401. In a case where it is determined No in S401, the processing proceeds to processing in S305. In other words, in a case where it is determined No in S401, the destination floor is set in a similar manner to the processing indicated in S105.

Figure 8:
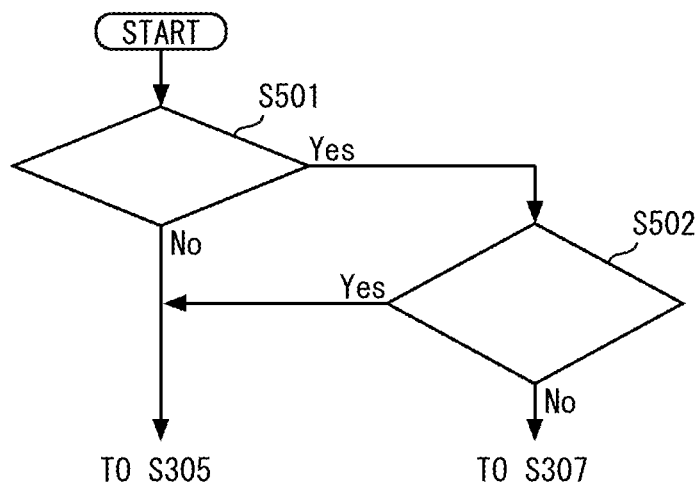
FIG. 8 is a flowchart indicating another example of the security determination processing.

FIG. 8 is a flowchart indicating another example of the security determination processing. FIG. 7 indicates an example where getting-off of the user on the destination restricted floor is completely rejected. On the other hand, FIG. 8 indicates an example where part of the users is permitted to get off on the destination restricted floor. In the example indicated in FIG. 8, the two-dimensional barcode B includes permission information for permitting getting-off on the seventh floor in addition to the information on the first candidate floor (first floor) and the second candidate floor (seventh floor).

Processing indicated in S501 in FIG. 8 is similar to the processing indicated in S401 in FIG. 7. In other words, if the first candidate floor is set as the departure floor in S304 in FIG. 6, the determination unit 39 determines whether or not the second candidate floor matches the destination restricted floor (S501). In a case where the second candidate floor matches the destination restricted floor, the determination unit 39 determines Yes in S501. In a case where the second candidate floor does not match the destination restricted floor, the determination unit 39 determines No in S501. In a case where it is determined No in S501, the processing proceeds to the processing in S305. In other words, in a case where it is determined No in S501, the destination floor is set in a similar manner to the processing indicated in S105.

The determination unit 40 determines whether or not movement to the destination restricted floor is permitted (S502). The determination unit 40 performs determination in S502 on the basis of the two-dimensional barcode B read in S301. Specifically, if the two-dimensional barcode B read in S301 includes the above-described permission information, the determination unit 40 determines that movement to the destination restricted floor is permitted (Yes in S502). In a case where it is determined Yes in S502, the processing proceeds to the processing in S305. In other words, in a case where it is determined Yes in S502, the destination floor is set in a similar manner to the processing indicated in S105.

On the other hand, if the two-dimensional barcode B does not include the permission information, the determination unit 40 determines that movement to the destination restricted floor is not permitted (No in S502). In a case where it is determined No in S502, the processing proceeds to the processing in S307. In other words, in a case where it is determined No in S502, the setting unit 36 does not set the second candidate floor as the destination floor. In the tablet terminal 14-1, it is determined as a call registration error. For example, in a case where it is determined No in S502, the indication control unit 38 indicates an error on the indicator 30.

Figure 9:
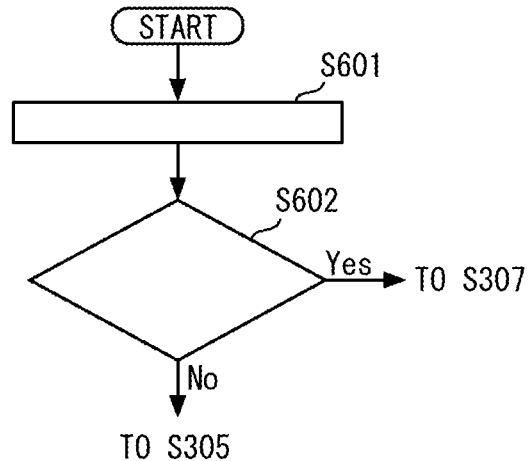
FIG. 9 is a flowchart indicating another example of the security determination processing.

FIG. 9 is a flowchart indicating another example of the security determination processing. In the example indicated in FIG. 9, the two-dimensional barcode B includes information indicating validity period in addition to the information on the first candidate floor (first floor) and the second candidate floor (seventh floor).

In the example indicated in FIG. 9, if the first candidate floor is set as the departure floor in S304 in FIG. 6, the specification unit 34 specifies validity period on the basis of the two-dimensional barcode B read in S301 (S601). The determination unit 39 determines whether or not the validity period of the two-dimensional barcode B specified in S601 is expired (S602). The determination unit 39 determines Yes in S602 if the validity period of the two-dimensional barcode B is expired. In a case where it is determined Yes in S602, the processing proceeds to the processing in S307. In other words, in a case where it is determined Yes in S602, the setting unit 36 does not set the second candidate floor as the destination floor. In the tablet terminal 14-1, it is determined as a call registration error. For example, in a case where it is determined Yes in S602, the indication control unit 38 indicates an error on the indicator 30.

On the other hand, the determination unit 39 determines No in S602 if the validity period of the two-dimensional barcode B is not expired. In a case where it is determined No in S602, the processing proceeds to the processing in S305. In other words, in a case where it is determined No in S602, the destination floor is set in a similar manner to the processing indicated in S105.

Note that the security determination processing indicated in FIG. 9 may be performed before the processing indicated in S303 in FIG. 6. In such a case, in a case where it is determined Yes in S602, the processing proceeds to the processing in S307. In other words, in a case where it is determined Yes in S602, the setting unit 36 does not set the departure floor and the destination floor. On the other hand, in a case where it is determined No in S602, the processing proceeds to the processing in S303. Thereafter, if it is determined Yes in S303, the departure floor and the destination floor are set by the setting unit 36.

Figure 10:
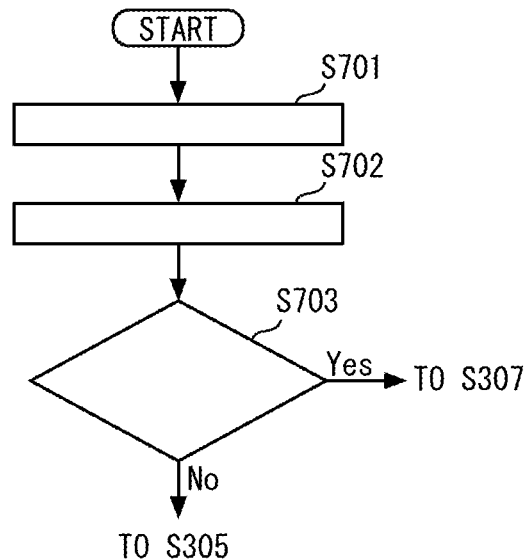
FIG. 10 is a flowchart indicating another example of the security determination processing.

FIG. 10 is a flowchart indicating another example of the security determination processing. In the example indicated in FIG. 10, the two-dimensional barcode B includes information indicating an identification number in addition to the information on the first candidate floor (first floor) and the second candidate floor (seventh floor).

In the example indicated in FIG. 10, if the first candidate floor is set as the departure floor in S304 in FIG. 6, the specification unit 34 specifies an identification number on the basis of the two-dimensional barcode B read in S301 (S701). Further, the specification unit 34 specifies the number of times of call registration based on the two-dimensional barcode B on the basis of the identification number specified in S701 (S702). For example, the number of times of call registration is counted for each identification number, that is, for each two-dimensional barcode and stored in the controller 10. The specification unit 34 acquires the number of times of registration stored in association with the identification number specified in S701 from the controller 10 in S702.

The determination unit 39 determines whether or not the number of times of call registration specified in S702 exceeds a specific reference number of times (S703). Information on the reference number of times is stored in the storage unit 32. If the number of times of call registration based on the two-dimensional barcode B exceeds the reference number of times, the determination unit 39 determines Yes in S703. In a case where it is determined Yes in S703, the processing proceeds to the processing in S307. In other words, in a case where it is determined Yes in S703, the setting unit 36 does not set the second candidate floor as the destination floor. In the tablet terminal 14-1, it is determined as a call registration error. For example, in a case where it is determined Yes in S703, the indication control unit 38 indicates an error on the indicator 30.

On the other hand, if the number of times of call registration based on the two-dimensional barcode B does not exceed the reference number of times, the determination unit 39 determines No in S703. In a case where it is determined No in S703, the processing proceeds to the processing in S305. In other words, in a case where it is determined No in S703, the destination floor is set in a similar manner to the processing indicated in S105, and the call registration request C is transmitted to the controller 10 in S306. The registration request C includes information on the identification number of the two-dimensional barcode B.

Also in the present example, the operation flow indicated in FIG. 4 is performed in the controller 10. Further, in the present example, if a call corresponding to the destination floor is registered by the call registration unit 21, the number of times of call registration stored in association with the identification number is incremented by one.

Note that the security determination processing indicated in FIG. 10 may be performed before the processing indicated in S303 in FIG. 6. In such a case, in a case where it is determined Yes in S703, the processing proceeds to the processing in S307. In other words, in a case where it is determined Yes in S703, the setting unit 36 does not set the departure floor and the destination floor. On the other hand, in a case where it is determined No in S703, the processing proceeds to the processing in S303. Thereafter, if it is determined Yes in S303, the departure floor and the destination floor are set by the setting unit 36.

As another example, the two-dimensional barcode B may include information on three or more candidate floors. In such a case, the tablet terminal 14 further includes a determination unit 41 as illustrated in FIG. 2. Further, for example, the operation flow indicated in FIG. 3 is performed in the tablet terminal 14. An example where the user who visits the office located on the seventh floor moves from the first floor that is an entrance floor of the building A to the seventh floor and then moves to a meeting room located on the tenth floor will be described below. In this example, the two-dimensional barcode B includes information on candidate floors indicated in Table 1.

TABLE 1

| FIRST CANDIDATE FLOOR | 15TH FLOOR |
| SECOND CANDIDATE FLOOR | SEVENTH FLOOR |
| THIRD CANDIDATE FLOOR | TENTH FLOOR |
| FOURTH CANDIDATE FLOOR | FIRST FLOOR |
| FIFTH CANDIDATE FLOOR | SEVENTH FLOOR |

In the tablet terminal 14-1, it is determined whether or not the two-dimensional barcode is read (S101). The user causes the two-dimensional barcode B to be indicated on the display of the mobile terminal 16 at the hall 13-1. As described above, in the present example, the two-dimensional barcode B includes information on the fourth candidate floor (first floor). If the camera 31 captures an image of the two-dimensional barcode B and the reading unit 33 reads the two-dimensional barcode B, it is determined Yes in S101.

The specification unit 34 specifies all the candidate floors indicated in Table 1 in S102. By this means, the determination unit 35 determines Yes in S103. The setting unit 36 sets the fourth candidate floor determined as matching the installation floor, that is, the first floor as the departure floor in S104.

Figure 11:
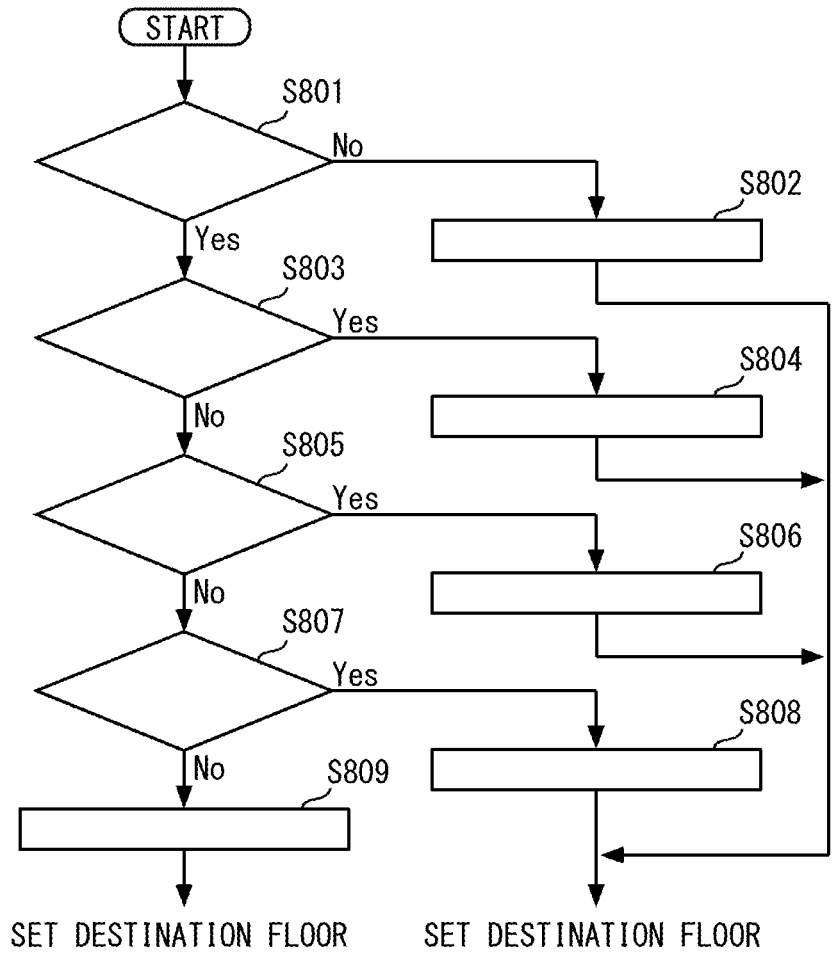
FIG. 11 is a flowchart indicating an example of destination floor setting processing.

FIG. 11 is a flowchart indicating an example of destination floor setting processing. In other words, FIG. 11 indicates the processing to be performed in S105. The determination unit 41 determines another candidate floor that becomes the destination floor among the candidate floors except the candidate floor that matches the installation floor among the candidate floors specified by the specification unit 34 in S102. The setting unit 36 sets the candidate floor determined by the determination unit 41 as the destination floor. The determination unit 41 performs the determination on the basis of specific conditions. FIG. 11 indicates an example where the determination unit 41 performs determination on the basis of read date and time of the two-dimensional barcode B as an example of the conditions.

The determination unit 41 first determines whether or not the read date of the two-dimensional barcode B is a weekday (S801). Note that the determination unit 41 performs determination immediately after the two-dimensional barcode B is read. Thus, the read date of the two-dimensional barcode B may be read as this date. In a case where it is determined No in S801, the determination unit 41 determines the first candidate floor as the above-described another candidate floor (S802). An office of a management company of the building A is located on the 15th floor that is the first candidate floor. The first candidate floor is a floor set in advance as the destination floor on holidays, and the like, during which the office on the seventh floor is not open.

In a case where it is determined Yes in S801, the determination unit 41 then determines whether or not read time of the two-dimensional barcode B is included in hours TP1 (S803). The hours TP1 are set in advance. For example, the hours TP1 are from 0 o'clock to 9 o'clock. Note that the read time of the two-dimensional barcode B may be read as current time. In a case where it is determined Yes in S803, the determination unit 41 determines the second candidate floor as the above-described another candidate floor (S804).

For example, if the user waves the two-dimensional barcode B over the camera 31 of the tablet terminal 14-1 in the morning of the weekday, it is determined Yes in S803, and the second candidate floor is set as the destination floor. By this means, the user can get on the car 5 from the hall 13-1 and get off the car 5 at the hall 13-7.

In a case where it is determined No in S803, the determination unit 41 then determines whether or not the read time of the two-dimensional barcode B is included in hours TP2 (S805). The hours TP2 are set in advance. For example, the hours TP2 are from 12 o'clock to 13 o'clock. In a case where it is determined Yes in S805, the determination unit 41 determines the third candidate floor as the above-described another candidate floor (S806).

For example, if the user who has participated in a meeting on the seventh floor in the morning waves the two-dimensional barcode B over the camera 31 of the tablet terminal 14-7 at lunch break, it is determined Yes in S805, and the third candidate floor is set as the destination floor. By this means, the user can get on the car 5 from the hall 13-7 and get off the car 5 at the hall 13-10. In other words, the user can move to a meeting room on the tenth floor on which the next meeting is to be held.

In a case where it is determined No in S805, the determination unit 41 then determines whether or not read time of the two-dimensional barcode B is included in hours TP3 (S807). The hours TP3 are set in advance. For example, the hours TP3 are from 16 o'clock to 22 o'clock. In a case where it is determined Yes in S807, the determination unit 41 determines the fourth candidate floor as the above-described another candidate floor (S808).

For example, if the user who has finished the meeting on the tenth floor waves the two-dimensional barcode B over the camera 31 of the tablet terminal 14-10 at 17 o'clock, it is determined Yes in S807, and the fourth candidate floor is set as the destination floor. By this means, the user can get on the car 5 from the hall 13-10 and get off the car 5 at the hall 13-1. In other words, the user can move to the first floor and exit the building A.

In a case where it is determined No in S807, the determination unit 41 determines the fifth candidate floor as the above-described another candidate floor (S809). Note that in the example indicated in FIG. 11, the processing may proceed to the processing in S107 in a case where it is determined No in S807.

As another example, the tablet terminal 14 may further include an information conversion unit 42 as illustrated in FIG. 2. In the controller 10, a floor name for control is used for call registration, and the like. The floor name for control is different from a floor name recognized by the user. Thus, floor information representing correspondence between the floor name for indication and the floor name for control in the building A is stored in the storage unit 32 of the tablet terminal 14. Table 2 indicates an example of the floor information.

TABLE 2

| FLOOR NAME FOR CONTROL | FLOOR NAME FOR INDICATION (ACTUAL FLOOR NAME IN BUILDING A) |
|---|---|
| 1 | B2 |
| 2 | B1 |
| 3 | L |
| 4 | 2 |
| 5 | 2M |
| 6 | 3 |
| . | . |
| . | . |
| . | . |
| 20 | 17 |
| 21 | R |
| 22 | — |
| . | . |
| . | . |
| . | . |
| 128 | — |

The information conversion unit 42 converts the floor name for indication into the floor name for control on the basis of the floor information stored in the storage unit 32 in a case where data is transmitted to the controller 10. Further, the information conversion unit 42 converts the floor name for control into the floor name for indication on the basis of the floor information stored in the storage unit 32 in a case where data is received from the controller 10.

In a similar manner, in a case where the elevator device 1 is included in a group control system, in the system, an elevator number name for control is used for call registration, and the like. The elevator number name for control is different from an elevator number name recognized by the user. Thus, elevator number information representing correspondence between the elevator number name for indication and the elevator number name for control in the system is stored in the storage unit 32 of the tablet terminal 14. Table 3 indicates an example of the elevator number information.

TABLE 3

| ELEVATOR NUMBER NAME FOR CONTROL | ELEVATOR NUMBER NAME FOR INDICATION (ACTUAL ELEVATOR NUMBER NAME IN BUILDING A) |
|---|---|
| F | 1 |
| G | 2 |
| H | 3 |

TABLE 3-continued

| ELEVATOR NUMBER NAME FOR CONTROL | ELEVATOR NUMBER NAME FOR INDICATION (ACTUAL ELEVATOR NUMBER NAME IN BUILDING A) |
|---|---|
| I | 4 |
| A | S1 |
| B | S2 |
| C | S3 |
| D | S4 |
| J | B1 |
| K | B2 |
| L | B3 |
| M | B4 |

The information conversion unit 42 converts the elevator number name for indication into the elevator number name for control on the basis of the elevator number information stored in the storage unit 32 in a case where data is transmitted to a group controller (not illustrated) that performs group control. Further, the information conversion unit 42 converts the elevator number name for control into the elevator number name for indication on the basis of the elevator number information stored in the storage unit 32 in a case where data is received from the group controller or the controller 10.

As illustrated in FIG. 2, the tablet terminal 14 may further include an information registration unit 43. The information registration unit 43 has a function of registering information in the storage unit 32.

For example, upon installation of the elevator device 1, a two-dimensional barcode B1 for setting is created by a specialized engineer. The two-dimensional barcode B1 for setting includes information on the installation floor and the floor information as setting information. The two-dimensional barcode B1 may further include the elevator number information.

When the elevator device 1 is installed, the two-dimensional barcode B1 is waved over the camera 31. By this means, an image of the two-dimensional barcode B1 is captured by the camera 31, and the two-dimensional barcode B1 is read by the reading unit 33. If the two-dimensional barcode B1 for setting is read, the information registration unit 43 causes the setting information included in the two-dimensional barcode B1 to be stored in the storage unit 32. By this means, the information on the installation floor, the floor information, and the like, can be easily registered in the storage unit 32.

Figure 12:
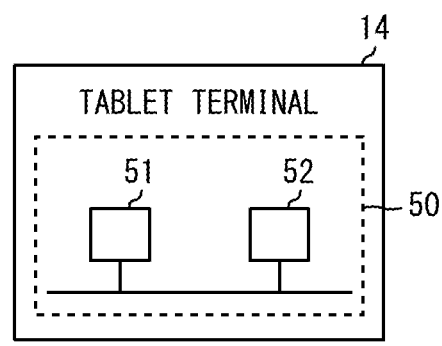
FIG. 12 is a diagram illustrating an example of hardware resources of the tablet terminal.

FIG. 12 is a diagram illustrating an example of hardware resources of the tablet terminal 14. The tablet terminal 14 includes processing circuitry 50 including a processor 51 and a memory 52 as the hardware resources. The processing circuitry 50 may include a plurality of processors 51. The processing circuitry 50 may include a plurality of memories 52.

In the present embodiment, respective units indicated with reference numerals 32 to 43 indicate functions of the tablet terminal 14. A function of the storage unit 32 is implemented by the memory 52. Functions of the respective units indicated with reference numerals 33 to 43 can be implemented by software, firmware, or a combination of the software and the firmware described as a program. The program is stored in the memory 52. The tablet terminal 14 implements the functions of the respective units indicated with the reference numerals 33 to 43 by the processor 51 executing the programs stored in the memory 52.

The processor 51 is also referred to as a central processing unit (CPU), a central processing device, a processing device, an arithmetic operation device, a microprocessor, a microcomputer or a DSP. As the memory 52, a semiconductor memory, a magnetic disk, a flexible disk, an optical disk, a compact disk, a mini disk or a DVD may be employed. The semiconductor memories that can be employed include a RAM, a ROM, a flash memory, an EPROM, an EEPROM, and the like.

Figure 13:
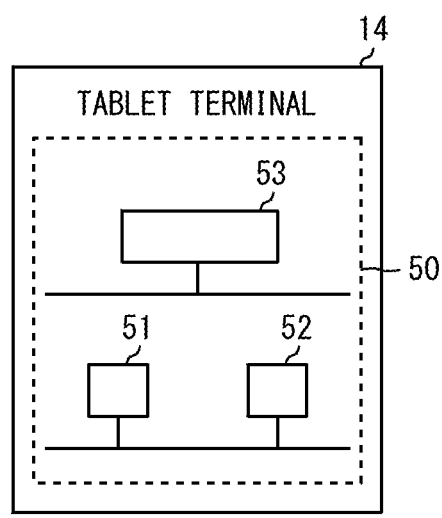
FIG. 13 is a diagram illustrating another example of the hardware resources of the tablet terminal.

FIG. 13 is a diagram illustrating another example of the hardware resources of the tablet terminal 14. In the example illustrated in FIG. 13, the tablet terminal 14 includes the processing circuitry 50 including the processor 51, the memory 52 and dedicated hardware 53. FIG. 13 illustrates an example where part of the functions of the tablet terminal 14 is implemented by the dedicated hardware 53. All of the functions of the tablet terminal 14 may be implemented by the dedicated hardware 53. As the dedicated hardware 53, a single circuit, a complex circuit, a programmed processor, a parallel programmed processor, an ASIC, an FPGA or a combination of these can be employed.

The hardware resources of the controller 10 are similar to those in the example illustrated in FIG. 12 or FIG. 13. The controller 10 includes processing circuitry including a processor and a memory as the hardware resources. The controller 10 implements functions of respective units indicated with reference numerals 21 to 23 by the processor executing the programs stored in the memory. The controller 10 may include processing circuitry including a processor, a memory and dedicated hardware as the hardware resources. Part or all of the functions of the controller 10 may be implemented by the dedicated hardware.

INDUSTRIAL APPLICABILITY

The present disclosure can be applied to a call registration device using a two-dimensional barcode.

REFERENCE SIGNS LIST 1 elevator device, 2 network, 3 server, 5 car, 6 counterweight, 7 shaft, 8 rope, 9 traction machine, 10 controller, 11 machine room, 12 communication device, 13 hall, 14 tablet terminal, 15 access point, 16 mobile terminal, 21 call registration unit, 22 operation control unit, 23 indication control unit, 30 indicator, 31 camera, 32 storage unit, 33 reading unit, 34 specification unit, 35 determination unit, 36 setting unit, 37 communication unit, 38 indication control unit, 39 determination unit, 40 determination unit, 41 determination unit, 42 information conversion unit, 43 information registration unit, 50 processing circuitry, 51 processor, 52 memory, 53 dedicated hardware

The invention claimed is:

1. A call registration device comprising:
a reader configured to read a two-dimensional barcode including information on a plurality of candidate floors; and
processing circuitry configured to specify the plurality of candidate floors on a basis of the two-dimensional barcode;
the processing circuitry is further configured to determine whether or not a candidate floor that matches an installation floor of the reader is included in the specified plurality of candidate floors;
the processing circuitry is further configured to, in a case where it is determined that the candidate floor that matches the installation floor is included, set the candidate floor as a departure floor and set another candidate floor included in the plurality of candidate floors as a destination floor;
the processing circuitry is further configured to register a call for a car of an elevator on a basis of the set departure floor and the set destination floor; and
the processing circuitry is further configured to, in a case where it is determined that the candidate floor that matches the installation floor is not included, set the installation floor as the departure floor and set a candidate floor farthest from the installation floor among the plurality of candidate floors as the destination floor.

2. The call registration device according to claim 1, wherein the processing circuitry is configured:
to determine whether or not the another candidate floor matches a specific destination restricted floor, and
not to, in a case where it is determined that the another candidate floor matches the destination restricted floor, set the another candidate floor as the destination floor.

3. The call registration device according to claim 1, wherein the processing circuitry is configured:
to determine whether or not the another candidate floor matches a specific destination restricted floor, and
to determine whether or not movement to the destination restricted floor is permitted on a basis of the two-dimensional barcode read by the reader,
wherein in a case where it is determined that the another candidate floor matches the destination restricted floor, the processing circuitry is configured to set the another candidate floor as the destination floor if it is determined that movement to the destination restricted floor is permitted, and not to set the another candidate floor as the destination floor if it is determined that movement to the destination restricted floor is not permitted.

4. The call registration device according to claim 1, wherein the processing circuitry is configured:
to specify validity period on a basis of the two-dimensional barcode read by the reader,
to determine whether or not the specified validity period is expired, and
not to set the destination floor in a case where it is determined that the validity period is expired.

5. The call registration device according to claim 1, wherein the processing circuitry is configured:
to determine whether or not a number of times of call registration based on the two-dimensional barcode exceeds a reference number of times, and
not to set the destination floor in a case where it is determined that the number of times of call registration exceeds the reference number of times.

6. The call registration device according to claim 1, wherein the two-dimensional barcode includes information on three or more candidate floors as the plurality of candidate floors, and
wherein the processing circuitry is configured to determine the another candidate floor on a basis of a specific condition among candidate floors except the candidate floor that matches the installation floor among the plurality of candidate floors.

7. The call registration device according to claim 1, wherein the processing circuitry is configured
to store setting information included in the two-dimensional barcode for setting, and
wherein as the setting information, the two-dimensional barcode for setting includes:
information on the installation floor; and floor information representing correspondence between a floor name for indication and a floor name for control for call registration in a building in which the reader is installed.

\* \* \* \* \*